United States Patent
Hashida et al.

(10) Patent No.: US 7,754,374 B2
(45) Date of Patent: Jul. 13, 2010

(54) PROTECTIVE COVER FOR A BATTERY ASSEMBLY

(75) Inventors: Osamu Hashida, Yokohama (JP); Takeyuki Kokubo, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1214 days.

(21) Appl. No.: 11/333,802

(22) Filed: Jan. 17, 2006

(65) Prior Publication Data

US 2006/0178051 A1 Aug. 10, 2006

(30) Foreign Application Priority Data

Jan. 18, 2005 (JP) ............................. 2005-010949
Nov. 14, 2005 (JP) ............................. 2005-329193

(51) Int. Cl.
*H01R 24/00* (2006.01)
(52) U.S. Cl. .................... 429/96; 439/627; 429/65; 429/99; 429/151; 429/153; 429/159
(58) Field of Classification Search .............. 429/65, 429/96–100, 151–161, 176
See application file for complete search history.

(56) References Cited

U.S. PATENT DOCUMENTS 5,804,770 A * 9/1998 Tanaka ..................... 174/138 F
6,410,184 B1 * 6/2002 Horiuchi et al. ............. 429/156

FOREIGN PATENT DOCUMENTS

JP 2001-345082 12/2001

* cited by examiner

*Primary Examiner*—Dah-Wei D Yuan
*Assistant Examiner*—Amanda Barrow
(74) *Attorney, Agent, or Firm*—Young Basile

(57) ABSTRACT

The disclosure is directed to a battery assembly that includes a protective cover. The protective cover is positioned over a side plate that includes connections, such as a bus bar and a fixing member, that allow for battery operation. One or more flexible openings within the protective cover open to accept the fixing member, such as a screw or bolt, and close once the fixing member has passed. In this manner, the flexible opening allows for easy assembly and maintenance of the battery assembly while providing a mechanism of protecting the battery components from environmental elements. In addition, the flexible opening may be made by one or more cuts in the protective cover, wherein material elasticity enables the flexible opening to open and close.

35 Claims, 12 Drawing Sheets

PROTECTIVE COVER FOR A BATTERY ASSEMBLY

This application claims priority from Japanese Patent Application No. 2005-010949, filed Jan. 18, 2005, and Japanese Patent Application No. JP 2005-329193, filed Nov. 14, 2005, the entire content of which is incorporated herein by reference.

TECHNICAL FIELD

The invention relates to energy storage device and, more particularly, battery assemblies.

BACKGROUND

Batteries may be produced to include multiple battery modules. Each battery module contains a type of chemical that is used to produce an electric current. In some cases, the battery modules are serially connected using a bus bar, which enables the output of high voltage to be produced from the battery. The bus bar is a metallic conductor, which is held by an electrically insulated side-plate, or end plate, and fixed to an output terminal placed on the side of the battery modules. Batteries constructed in this manner may be capable of operating large machinery or other equipment that necessitates a large voltage or current.

An assembled battery having multiple battery modules may be used within the transportation industry. For example, such as assembled battery may be mounted on vehicles such as automobiles, buses, or trains. In these cases, one or more batteries of various sizes may be needed. The battery may be used in conjunction with an internal combustion engine, hydrogen fuel cell, or other power source. In some cases, the battery may be used exclusively in an electric vehicle as cleaner fuel sources are used in transportation vehicles. In either case, the battery may be used to power electronic equipment.

SUMMARY

The disclosure is directed to a battery assembly that includes a protective cover. The protective cover is positioned over a side plate that includes electrical connections, such as a bus bar that allow for battery operation. One or more flexible openings within the protective cover open to accept a fixing member, such as a screw or bolt, and close once the fixing member has passed. In this manner, the flexible opening allows for easy assembly and maintenance of the battery assembly while the protective cover provides a mechanism for protecting the battery components from environmental elements. As one example, the flexible opening may be made by one or more cuts in the protective cover, wherein material elasticity enables the flexible opening to open and close.

Due to the assembled battery including several bus bars and fixing operations, such as fixing action and insulation, in conventional assembled batteries there is a risk of causing a short-circuit of the fixed bus bars during these operations. Therefore, it is often necessary to be cautious and attentive when performing these operations. Accordingly, it may be difficult to assemble or perform maintenance on these types of batteries. In addition, assembled batteries in transportation vehicles are commonly used in corrosive environments where fluids or solids can be detrimental to the structure or operation of the battery.

The protective cover of the battery assembly described herein covers the side-plate of the battery assembly to reduce short-circuits and protect the battery assembly from corrosive environments. In other words, the flexible openings in the protective cover may improve handling, installation, and maintenance of such a battery assembly.

In one embodiment, a battery assembly includes a plurality of battery modules, a side-plate that holds at least one bus bar that connects adjacent battery modules, a fixing member that fixes the bus bar to an output terminal on a side of each of the plurality of battery modules, and a protective cover that covers the side-plate, wherein the protective cover comprises a flexible opening.

In another embodiment, a method includes assembling a plurality of battery modules, attaching at least one bus bar to a side-plate, wherein the bus bar connects adjacent battery modules, fixing the bus bar to an output terminal on a side of each of the plurality of battery modules with a fixing member, covering the side-plate with a protective cover, and cutting the protective cover to form a plurality of flexible parts of a flexible opening.

In an additional embodiment, a battery assembly comprises a plurality of battery modules, means for holding at least one bus bar, wherein the bus bar connects adjacent ones of the plurality of battery modules, means for fixing the bus bar to output terminals on the side of the plurality of battery modules, and means for protecting holding means, wherein the protecting means comprises a means for accepting the fixing means by opening to receive the fixing means and closing as the fixing means is accepted.

In another additional embodiment, a battery assembly comprising a plurality of battery modules, a side-plate that holds at least one bus bar that connects adjacent battery modules, a fixing member that fixes the bus bar to an output terminal on a side of each of the plurality of battery modules, and a flexible opening that opens to accept the fixing member and closes once the fixing member passes through the flexible opening.

The embodiments of the disclosure may provide some advantages. For example, the protective cover may reduce the need for further insulation when installing the battery assembly or performing battery maintenance. The protective cover may also help to reduce corrosion or degradation of the battery when the assembly is exposed to corrosive environments such as the ones encountered by automobiles. In addition, the protective cover may prevent injury to a user coming in contact with the battery assembly.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
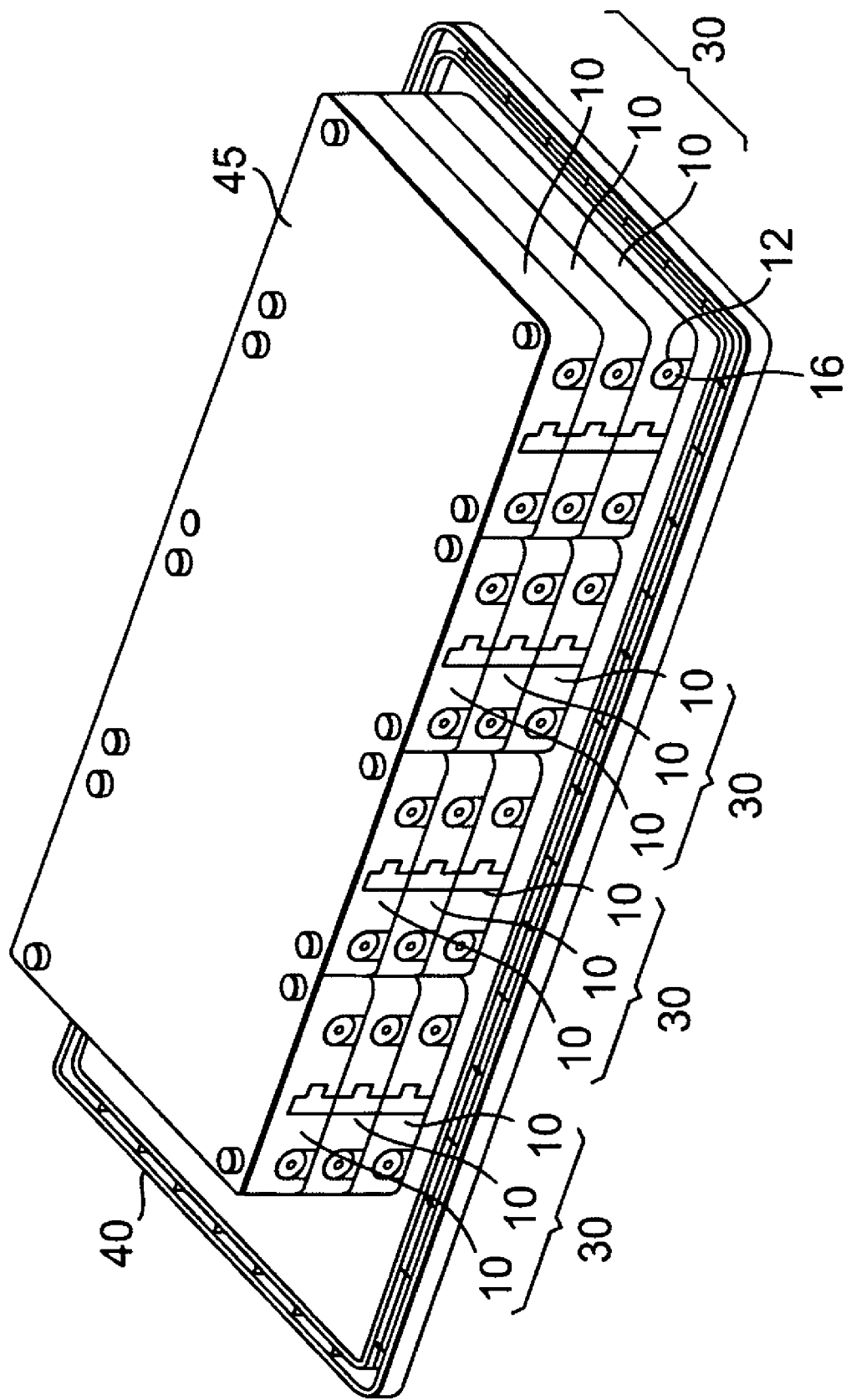
FIG. 1 is a perspective view of an exemplary battery assembly with a protective cover.
Figure 2:
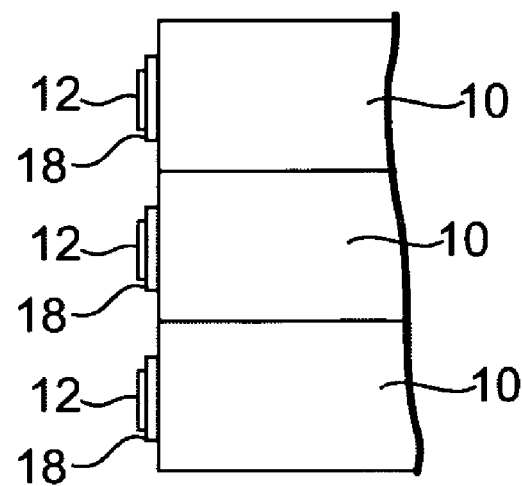
FIG. 2 is a side view of an exemplary battery module of the battery assembly of FIG. 1.
Figure 3:
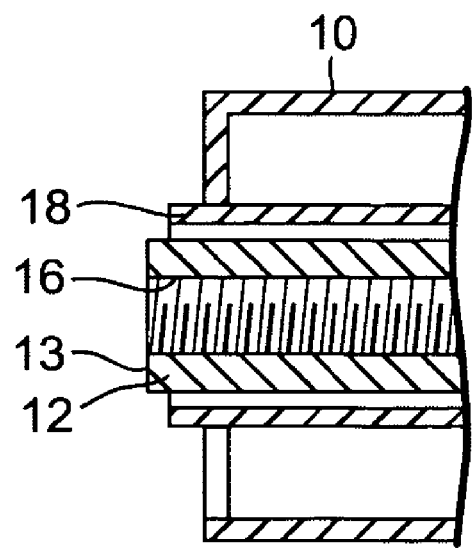
FIG. 3 is a cross-section view of the battery module of FIG. 2.
Figure 4:
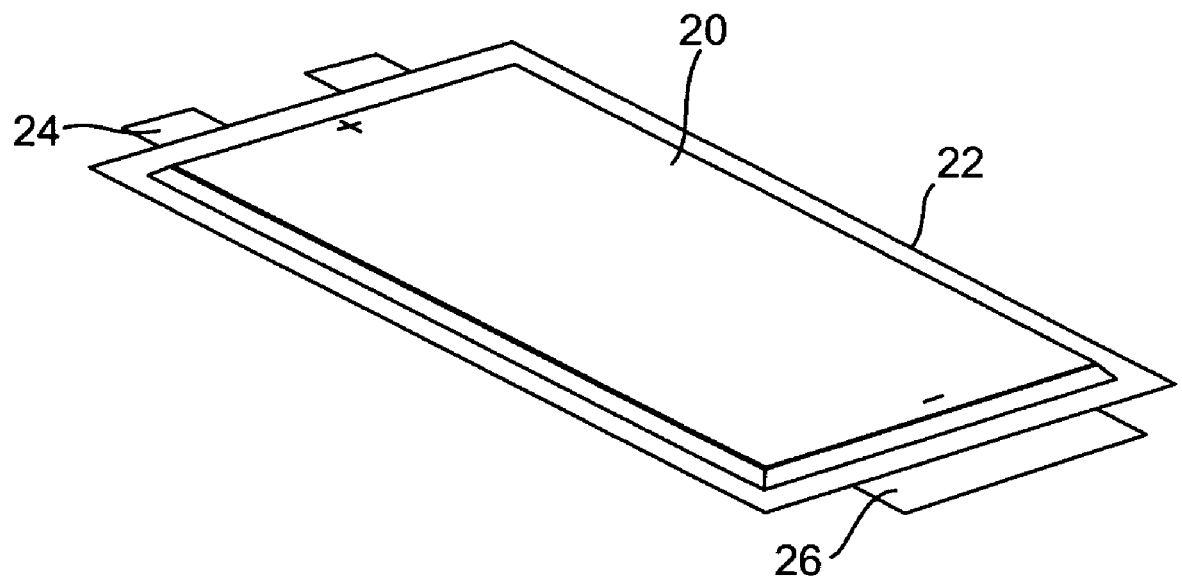
FIG. 4 is a perspective view showing an exemplary secondary cell of a battery module shown in FIG. 1.

FIG. 1 is a perspective view of an exemplary battery assembly with a protective cover. FIG. 2 is a side view of a battery module of the battery assembly of FIG. 1. FIG. 3 is a cross-section view of a battery module of FIG. 2. FIG. 4 is a perspective view showing an exemplary secondary cell of a battery module shown in FIG. 1.

The assembled battery according to the example of FIG. 1 is an in-vehicle cell mounted on vehicles, such as automobiles and trains, having twelve battery modules 10. In this example, the battery modules 10 are piled in three layers to form a module group 30. The assembled battery comprises four module groups 30. The module groups 30 are arranged in parallel. The number of battery modules 10 included in the assembled battery, the structure of the module group 30, or the connecting configuration are not limited to the number or structure shown in FIG. 1. Therefore, other embodiments may include more or less battery modules or other assembly configurations, possibly based upon the required performance of the assembled battery.

A constraining plate 45 is mounted on battery modules 10, which is located above battery modules 10 or module groups 30. Constraining plate 45 holds and fixes module groups 30 with the lower case 40 to create the assembled battery case.

U-shape notch holes of each battery module 10 are arranged, and the output terminal (positive and negative electrode) 12 is exposed on the same surface of the side of battery modules 10. Output terminal 12 has a terminal surface 13 in which a hole 16 is located. Hole 16 has an internal circumference in which a thread is formed. An insulation member 18 is sheathed around output terminal 12.

Battery modules 10 combine to form the illustrated type of assembled cells, having several secondary batteries 20 which are electrically and serially connected. This configuration may be favorable because high voltage is easily achievable. In addition, it is also possible to create batteries 20 with electric cells. The modulation of current or voltage is favorable in accordance with the handling properties and assembling properties during the manufacturing process, as well as the adaptability of the battery assembly to the change the layout of batteries 20 or battery modules 10 depending on the vehicle on which the module is mounted.

A secondary battery 20 is a flat lithium ion secondary battery, having an electric power generation component formed by laminating a positive electrode plate, a negative electrode plate, and a separator, in that sequence. The electric power generation component is sealed with an armoring material 22, such as a laminated film. Secondary battery 20 has a plate-like electrode tab 24 and 26 derived from armoring material 22. Electrode tab 24 is positive in polarity and electrode tab 26 is negative in polarity. For example, a nickel-hydrogen battery and a nickel-cadmium battery are applicable as secondary battery 20 of battery modules 10.

Figure 5:
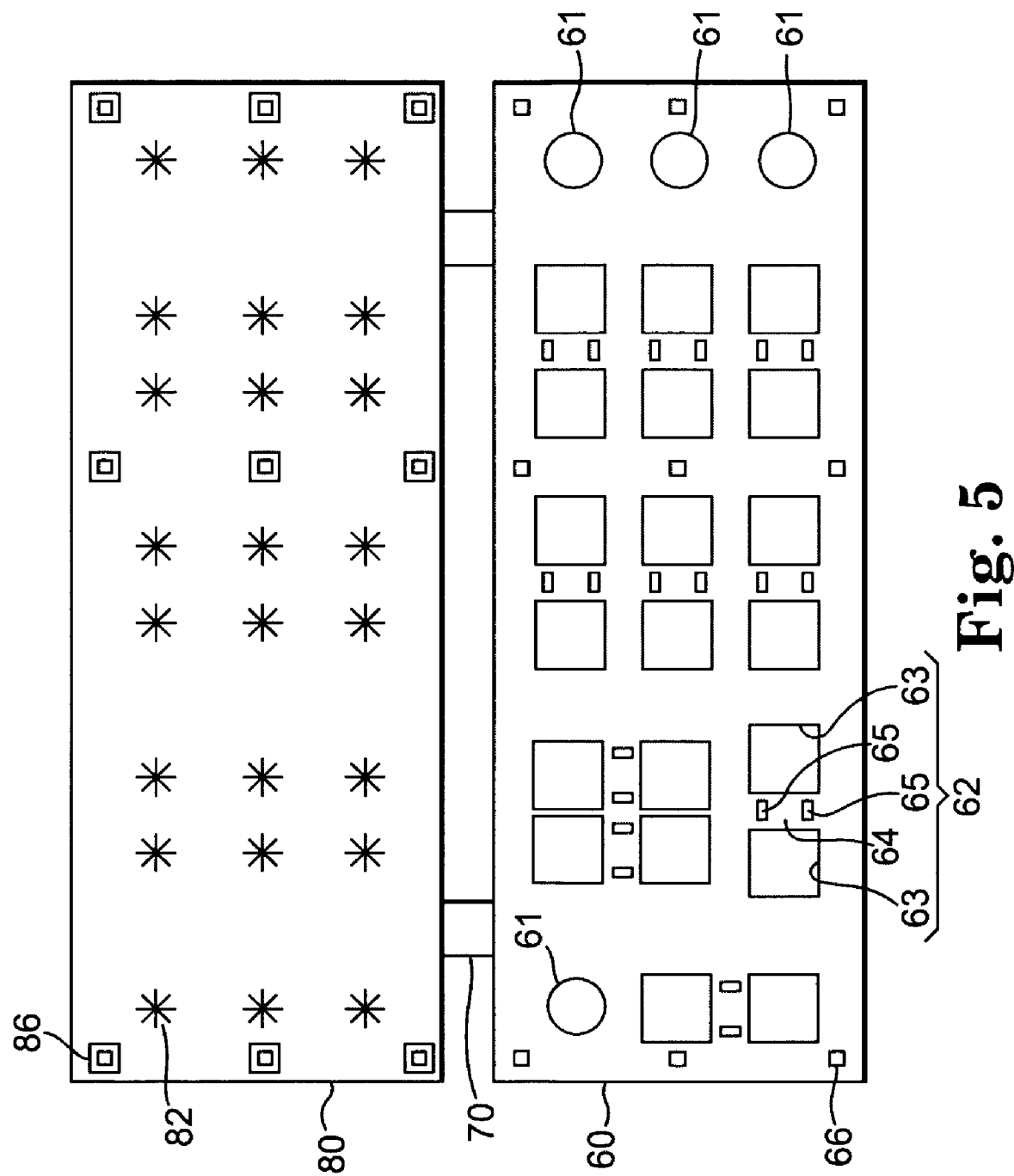
FIG. 5 is a plan view of an exemplary protection cover and a side plate.
Figure 6:
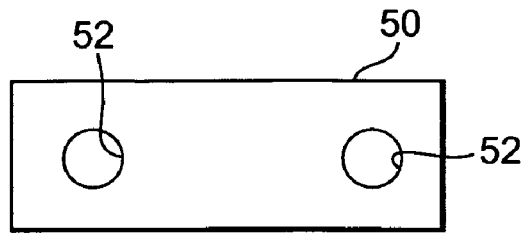
FIG. 6 is a plan view of a bus bar held by a side plate.
Figure 7:
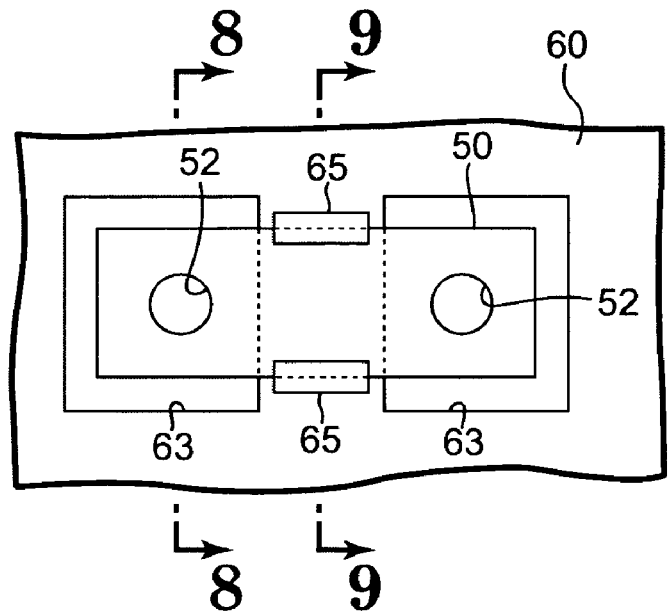
FIG. 7 is a plan view showing an example of the bus bar housing.
Figure 8:
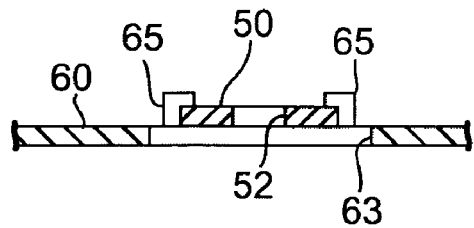
FIG. 8 is a cross-section view illustrating a hole in the bus bar of FIG. 7.
Figure 9:
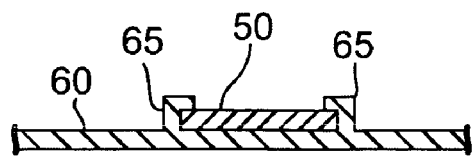
FIG. 9 is a cross-section view illustrating the solid portion of the bus bar of FIG. 7.

FIG. 5 is a plan view of an exemplary protection cover 80 and an exemplary side plate 60. FIG. 6 is a plan view of a bus bar 50 held by a side plate. FIG. 7 is a plan view showing an example of a bus bar within a housing. FIG. 8 is a cross-section view illustrating a hole in the bus bar of FIG. 7, where the cross-section is taken at the plan indicated by bold numbers 8 in FIG. 7. FIG. 9 is a cross-section view illustrating the solid portion of the bus bar of FIG. 7, wherein the cross-section is taken at the plane indicated by bold numbers 9 in FIG. 7.

As illustrated in FIGS. 5-9, one embodiment of the assembled battery according to the example of FIG. 1 further comprises bus bar 50 (shown in FIG. 6) for the electrical connection of adjacent battery modules. In addition, the assembled battery may further include a side-plate 60 (means for holding at least one bus bar shown in FIG. 5) for holding bus bar 50, protective cover 80 (means for protecting the holding means), and fixing member 92 (means for fixing the bus bar shown in FIG. 13) for fixing bus bar 50 to side-plate 60. Bus bar 50 is used to connect several battery modules 10 serially and achieve a high voltage output. Bus bar 50 is a flat rectangular metallic conductor, having a through-hole 52. Fixing member 92 is inserted in through-hole 52, and through-hole 52 is used for fixing the bus bar 50 to the output terminal 12 placed on the side of battery module 10.

Side-plate 60 and protective cover 80 are coupled by a bendable hinge member 70. Bendable hinge member 70 may be beneficial due to the fact that it is not a complicated mechanical part, which may facilitate reducing the size of the assembled battery and protective cover 80.

Side-plate 60, protective cover 80, and hinge member 70 are composed of electrical insulation resin by integral molding. Therefore, it is possible to reduce the cost of components through this construction. For example, the electrical insulation resin includes, but is not limited to, polypropylene or some other polymer or flexible composite. The thickness of the hinge member 70 is smaller than that of side-plate 60 and protective cover 80, and hinge member 70 is bendable in a shape of a relatively big circular arc. In other embodiments, hinge member 70 may comprise a crease or sharp angle and retain structural properties necessary for proper operation. Side-plate 60 has a housing 62 for storing bus bar 50 and a convex part 66 for fixing the protective cover 80 to the side-plate.

Seven housings 62 are arranged in a lateral direction and three housings 62 are arranged in a parallel direction. Opening 63 contains a bridge 64 and a gripper 65. Opening 63 is used to position through-hole 52 of bus bar 50 and insert fixing member 92. The size of opening 63 is bigger than terminal surface 13 of output terminal 12 and the bus bar terminal where through-hole 52 is placed. Bridge 64 is arranged in opening 63 where gripper 65 is placed. The side of the center part of bus bar 50 is removably attached to gripper 65 in order to prevent unwanted detaching of bus bar 50. Hole 61 is a through-hole used for fixing strong and light electric cables and bolts.

In one embodiment, protective cover 80 includes opening 82 and concave part 86 and is installed to cover side-plate 60 through the use of bending hinge member 70. Accordingly, it is possible to prevent bus bar 50 held by side-plate 60 from contacting foreign matters without separate insulation or causing a short-circuit. The foreign matters are, for example, electrically conductive parts and tools.

Not requiring separate insulation may be particularly favorable to the application to the assembled battery. For example, the assembled battery has many output terminals which requires a long time to complete the total assembly. Without protective cover 80, it may be necessary to utilize insulation (for example, attachment of an insulation tape) with each fixation operation in order to prevent a short-circuit. Accordingly, omitting separate insulation enables to significantly shorten the total time of the attaching and assembly of the battery.

Figure 10:
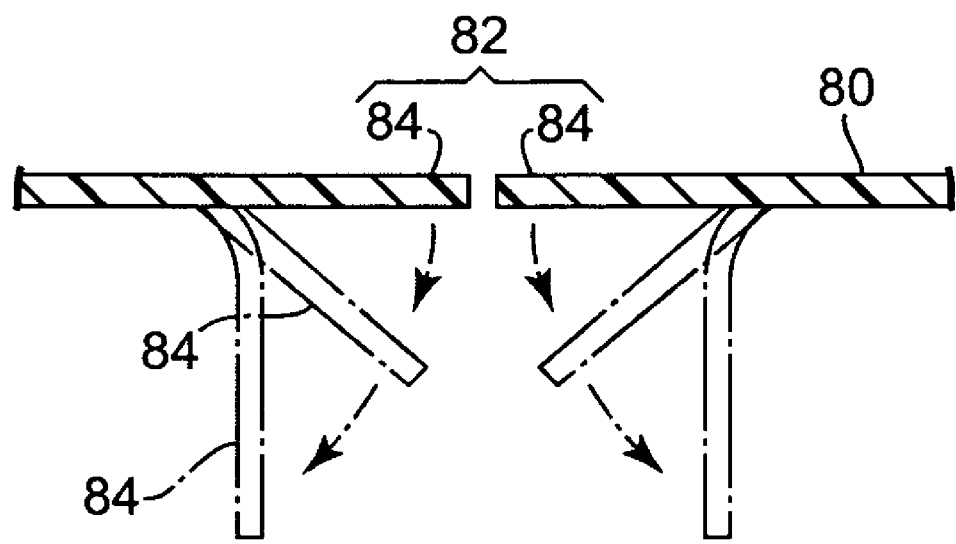
FIG. 10 is a cross-section of an exemplary flexible opening in the protective cover.
Figure 11:
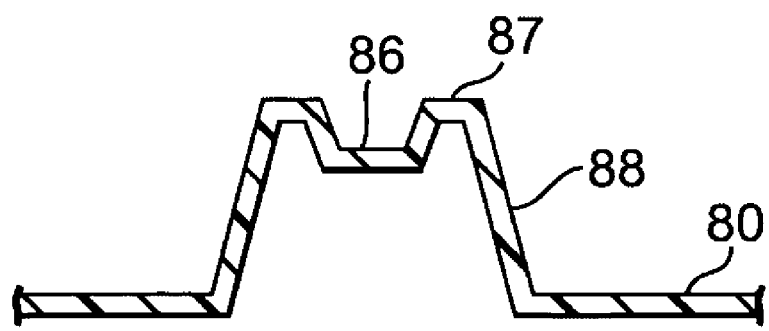
FIG. 11 is a cross-section of an exemplary concave part of the protective cover.
Figure 12:
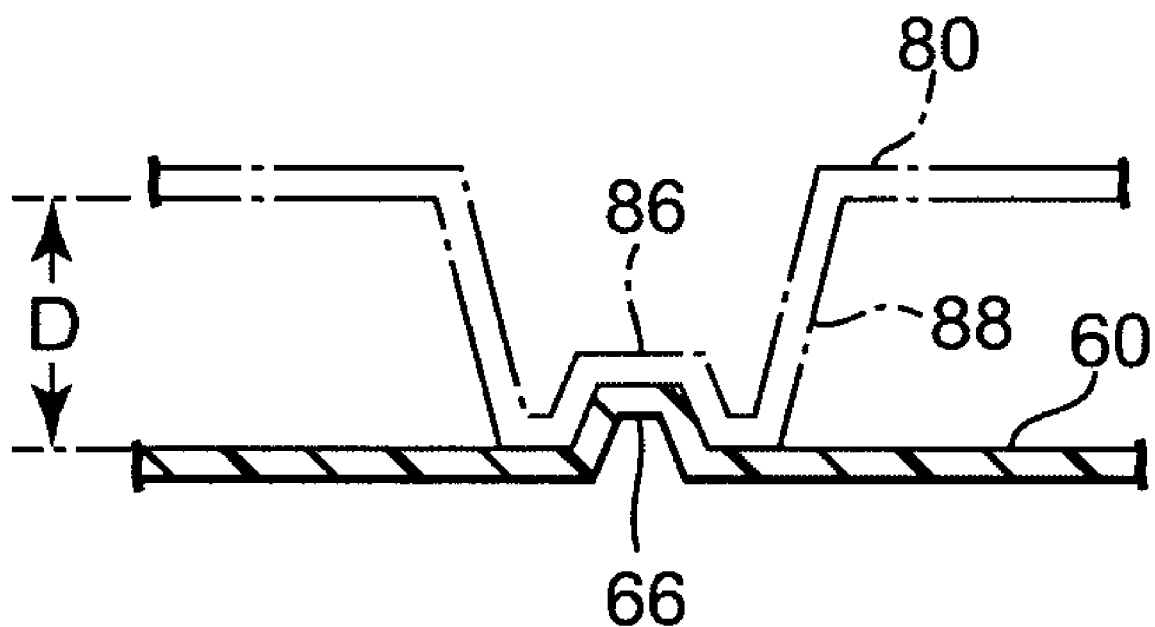
FIG. 12 is a cross-section of an exemplary convex part of the side plate.

FIG. 10 is a cross-section of an exemplary flexible opening in the protective cover. FIG. 11 is a cross-section of an exemplary concave part of the protective cover. FIG. 12 is a cross-section of an exemplary convex part of the side plate.

Opening 82 is used for inserting fixing member 92, where the opening includes flexible part 84. The flexible part 84 features bendable elasticity. When pressed, the flexible part is bent to open opening 82 with a bias force in the direction the arrows. On the other hand, when no bias force is present, the flexible part 84 is restored by its elasticity to close opening 82. Briefly, flexible part 84 allows easy construction of the battery through the use of opening 82.

Several flexible parts 84 are arranged radially toward the center of the opening 82 to facilitate the insertion of the fixing member 92. It may be favorable to form flexible part 84 from several cuts placed in protective cover 80. Alternatively, one cut may include multiple angles to create opening 84.

Concave part 86 of protective cover 80 corresponds, or mates, to convex part 66 of side-plate 60 and is coupled by the interface fit (see FIG. 12). The taper-shaped convex part 66 of side-plate 60 is joined to concave part 86 by the elastic interface fit, where the parts are removable from each other. Concave part 86 of protective cover 80 and convex part 66 of side-plate 60 function as a fixing structure for fixing protective cover 80 and side-plate 60 together. Accordingly, a separate part for fixing protective cover 80 and side-plate 60 is not required, which may lead to a simplified structure. In addition, the structure of convex part 66 and concave part 86 may be easily formed during the manufacturing process.

The concave part 86 is placed on the top surface 87 of the protruding part which projects from the nearly flat base. Accordingly, it is possible to easily form gap D corresponding to the height of protruding part 88 between protective cover 80 and side-plate 60, when concave part 86 and convex part 66 are joined by the interface fit. The space created by gap D is utilized for deforming flexible part 84 of opening 82 accepting fixing member 92. It is also possible to place convex part 66 on protective cover 80 and concave part 86 on side-plate 60.

Figure 13:
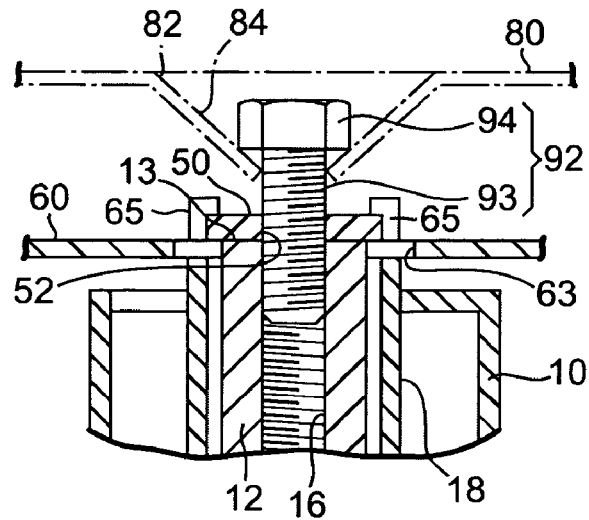
FIG. 13 is a cross-section view illustrating an exemplary fixing member inserted through a bus bar.

FIG. 13 is a plan view illustrating an exemplary fixing member inserted through a bus bar. Fixing member 92 is a bolt with axis 93 and head 94. The axis 93 has a communicable diameter for the through-hole 52 of the bus bar 50, and the thread is formed on the outer circumference. The head 94 can be inserted through opening 82 of protective cover 80, where the diameter of the head is bigger than that of through-hole 52 of bus bar 50. Accordingly, bus bar 50 can be easily and electrically connected due to head 94 of fixing member 92 by simply inserting the axis of fixing member 92 in through-hole 52 of bus bar 50.

Axis 93 corresponds to hole 16 arranged on terminal surface 13 of output terminal 12 placed on the side of battery modules 10. The thread on the outer circumference of axis 93 is screwed together with the a thread on the inner circumference of the hole 16. Accordingly, it is possible to join the stick-like rotor of the torque wrench with head 94 of fixing member 92 by the interface fit and to screw axis 93 of fixing member 92 together with hole 16 by rotating fixing member 92. The tool for rotating the fixing member 92 includes, but is not limited to, a torque wrench or screwdriver.

When axis 93 is inserted in opening 82 of protective cover 80, opening 82 can be opened by pressing and bending flexible part 84 of opening 82. On the other hand, when the entire fixing member 82 passes through opening 82, flexible part 84 is restored by its elasticity due to the loss of the bias force to deform flexible part 84, and opening 82 of the protective cover 80 is closed.

Briefly, opening 82 of protective cover 80 is closed when axis 93 of fixing member 92 is screwed together with hole 16 of output terminal 12 by the rotor of the torque wrench inserted in the opening 82, the bus bar 50 is fixed with output terminal 12, and then the rotor of the torque wrench is withdrawn from the opening 82. Protective cover 80 does not interfere with the fixation by fixing member 92, on the other hand, it retains the insulation of bus bar 50 from fixing member 92. Therefore, separate insulation is not necessary.

Figure 14:
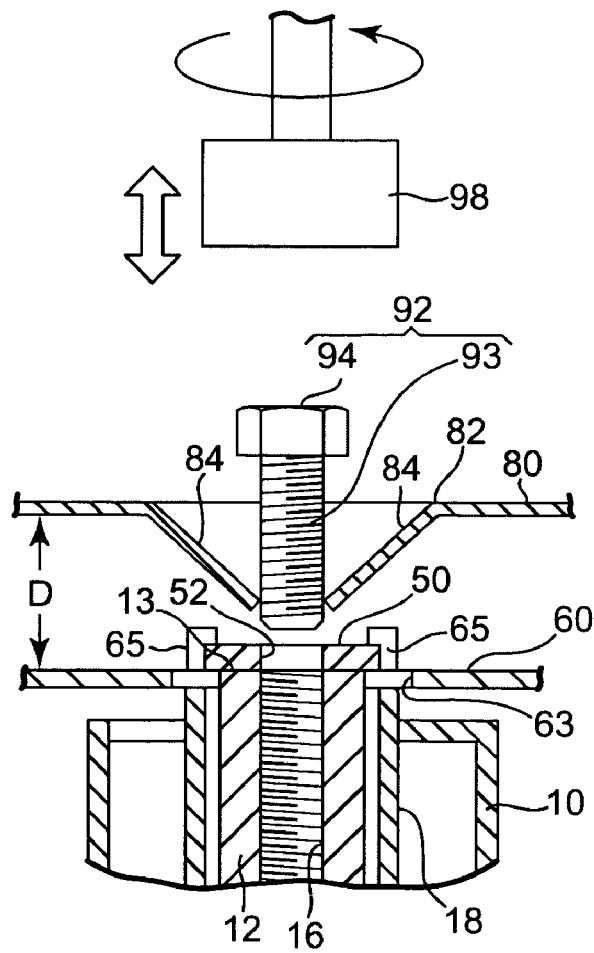
FIG. 14 is a cross-section illustrating the flexible opening accepting the fixing member.
Figure 15:
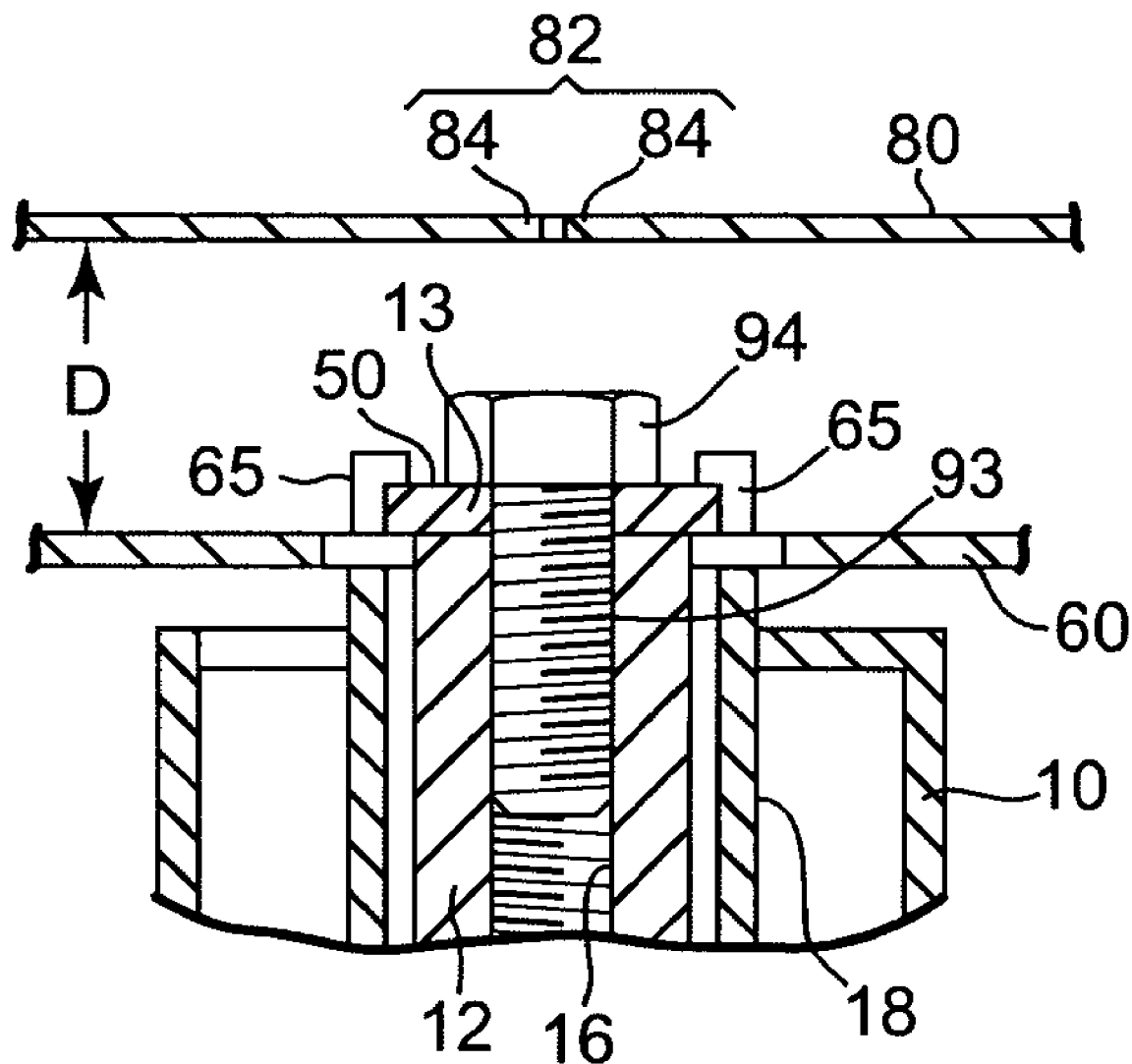
FIG. 15 is a cross-section illustrating the fixing member fixing the bus bar to the side-plate.

FIG. 14 is a cross-section illustrating the flexible opening accepting the fixing member. FIG. 15 is a cross-section illustrating the fixing member fixing the bus bar to the side-plate. In FIG. 15, the torque wrench 98 is omitted.

Side-plate 60 holding bus bar 50 is placed on the side of battery modules 10. The center of through-hole 52 of bus bar 50 is positioned so as to correspond with the center of the hole 16 of battery modules 10. Protective cover 80 is installed so as to cover side-plate 60 by bending hinge member 70. Bus bar 50 held by side-plate 60 prevents contact with foreign matters, which prevents a short-circuit of the battery.

When convex part 66 of side-plate 60 is joined to concave part 86 of protective cover 80 by the interface fit, side-plate 60 and protective cover 80 are fixed. At this time, the center of opening 82 of protective cover 80 is positioned so as to correspond with the center of through-hole 52 of bus bar 50. Protruding part 88 of protective cover 80 forms gap D between the protective cover 80 and side-plate 60 in order to allow for the deformation of the flexible part 84 and the fixation by the fixing member 92 (see FIG. 12). Thereafter, fixing member 92 is inserted in opening 82 of protective cover 80. Opening 82 of axis 93 of fixing member 92 is opened by pressing, or applying a bias force, and bending flexible part 84 of opening 82 (see FIG. 14).

Axis 93 of fixing member 92 passes through-hole 52 of bus bar 50 and is inserted in hole 16 formed on the terminal surface 13 of the output terminal 12 of battery modules 10. On the other hand, the rotor of torque wrench 98 is inserted in opening 82 and joined to head 94 of fixing member 92 by the interface fitted to rotate fixing member 92.

Axis 93 of fixing member 92 moves forward while being screwed together with hole 16. When bus bar 50 held by side-plate 60 is pressed by head 94 of fixing member 92 and bus bar 50 and output terminal 12 of the battery modules 10 are fixed, or connected, the insertion of fixing member 92 is complete (see FIG. 15).

Removing the interface fit between the rotor of torque wrench 98 and head 94 of fixing member 92 and withdrawing the rotor of torque wrench 98 from opening 82 by raising torque wrench 98, flexible part 84 is restored by its elasticity and opening 82 of protective cover 80 is closed. Briefly, opening 82 is closed when bus bar 50 held by side-plate 60 is fixed to output terminal 12 located on the side of battery modules 10 by fixing member 92.

When all securing of multiple bus bars 50 with output terminals 12 is complete, the assembled battery is mounted on vehicles by holding protective cover 80. As protective cover 80 functions to prevent bus bar 50 from exposure, the protective cover facilitates battery attachment, accessibility, and removal during maintenance tasks.

As mentioned above, short-circuiting of the fixed bus bar can be prevented without separate insulation because the side-plate for holding the bus bar is covered by the protective cover. On the other hand, the protective cover does not interfere with the fixation because the fixing member can be inserted via the opening in the protective cover to fix the bus bar with the output terminal placed on the side of the battery module. Accordingly, the fixation is easily conducted, which results in the improvement of battery installation, use, and maintenance. In other words, the assembled battery may provide improved battery handling and maintenance because of the protection provided by the protective cover.

In other embodiments, it may be favorable to form a slit at the lower end of side-plate 60 and a receptor joined to the slit by the interface fit at the upper end of the lower case 40 to facilitate the positioning of the side-plate 60.

The fixing structure is not limited to a mode that uses the interface fit of concave part 86 and convex part 66. For example, two-sided tapes, clips, and adhesives are also applicable. Fixing member 92 is not limited to bolts. For example, rivets can be used. Hinge member 70 may be constructed by forming separately and joined to side-plate 60 and protective cover 80.

Side-plate 60 and protective cover 80 may be coupled by appropriate members other than hinge member 80. It is also possible to install protective cover 80 on the side of the lower case without using hinge member 70. In addition, after completing the fixation, if necessary, protective cover 80 may be removed and separated.

Figure 16:
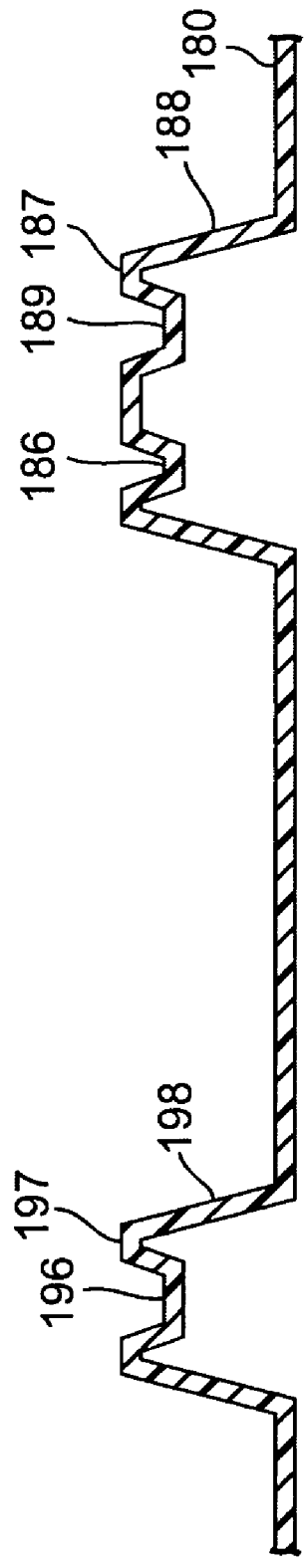
FIG. 16 is a cross-section view illustrating an exemplary protective cover.
Figure 17:
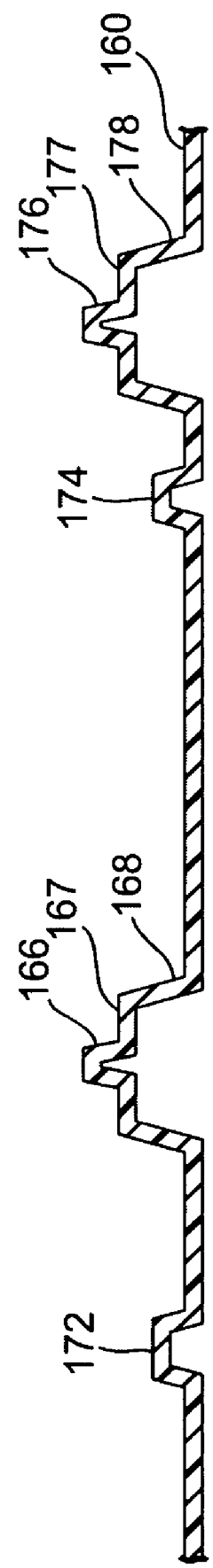
FIG. 17 is a cross-section view illustrating an exemplary side plate.

FIG. 16 is a cross-section view illustrating an exemplary protective cover. FIG. 17 is a cross-section view illustrating an exemplary side plate. FIGS. 16 and 17 differ from FIG. 12 due to reducing the space (dead space) occupied between the side-plate 60 and the protective cover 80.

More specifically, the fixing structure of FIGS. 16 and 17 include first and second fixing mechanisms in order to change the gap between the protective cover and the side-plate before and after completion of fixing the bus bars. When fixed by the second fixing mechanism, the gap is smaller than that in the case of being fixed by the first fixing mechanism. Therefore, the case for the assembled battery may be downsized. The description to follow will highlight differences when providing for a first and second fixing mechanism.

Protective cover 180, similar to protective cover 80, contains protruding parts 188 and 198 that project from the nearly flat base. Protruding part 188 has a top surface 187 on which concave parts 186 and 189 are arranged. Protruding part 198 has a top surface 197 on which concave part 196 is arranged. Protruding parts 188 and 198 have a similar height, and concave parts 186, 189, and 196 have a similar depth.

Side-plate 160 contains protruding parts 168 and 178 which project from the taper-like convex parts 172 and 174 arranged on the nearly flat base and from the base. Protruding part 168 has top surface 167 where the taper-like convex part 166 is arranged. Convex part 166 is joined to concave part 186 of protruding part 188 of protective cover 180 by an elastic interface fit and is removable. Convex part 166 and concave part 186 compose the first fixing mechanism. Thus, since the structure of convex part 166 and concave part 186 may be easily manufactured due to easy formation of the first fixing mechanism.

Convex part 172 (the second convex part) is joined to concave part 189 of protruding part 188 of protective cover 180 by an elastic interface fit and is removable. Convex part 174 is joined to concave part 196 by an elastic interface fit and is removable. Briefly, because the structure of convex parts 172 and 174 and concave parts 189 196 are not complicated, the second fixing mechanism may be easily formed during the manufacturing process.

Protruding part 178 has a top surface 177 on which convex part 176 is arranged. The taper-like convex part 176 may join concave part 196 of protruding part 198 of protective cover 180. Protruding parts 168 and 178 have similar heights. The height from the base of side-plate 160 to the top of convex parts 166 and 176 is set so as to be lower than that of protruding parts 188 and 198 of protective cover 180.

Side-plate 160 and protective cover 180 are coupled by the hinge member (not shown). Side-plate 160, protective cover 180, and the hinge member comprise of the electrical insulation resin by integral molding. The thickness of the hinge member is thinner than that of side-plate 160 and protective cover 180, where the hinge member is bendable to the shape of relatively large circular arc. In other embodiments, the hinge member may fold or form a crease. In other embodiments, it may be possible to place convex parts 166, 172, and 174 on protective cover 180 and concave parts 186, 189, and 196 on side-plate 160.

Figure 18:
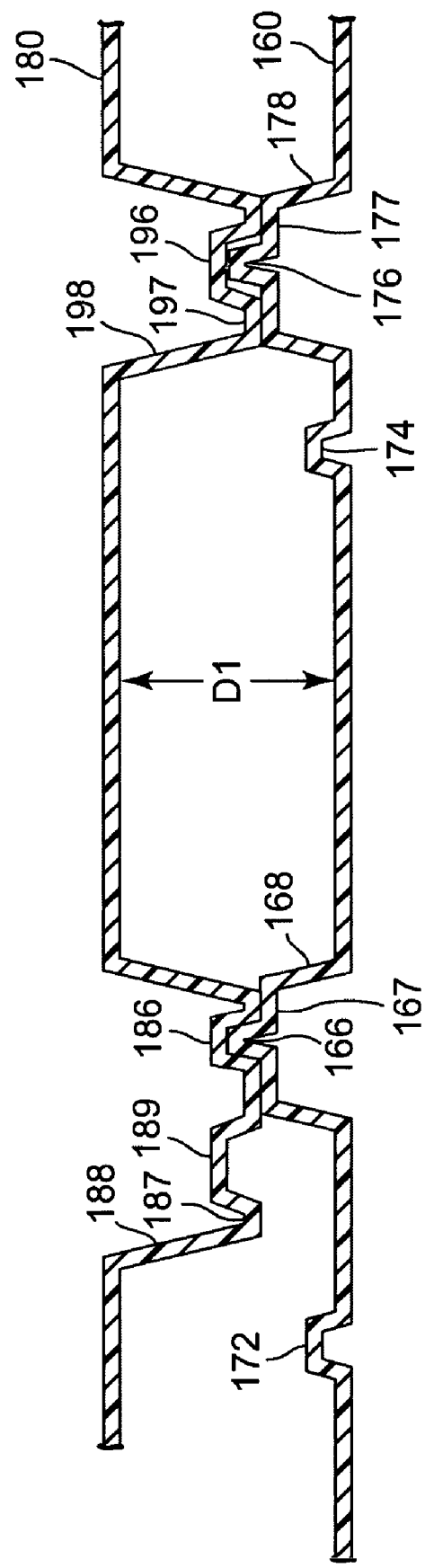
FIG. 18 is a cross-section view illustrating a first fastening position of the protective cover and the side-plate.
Figure 19:
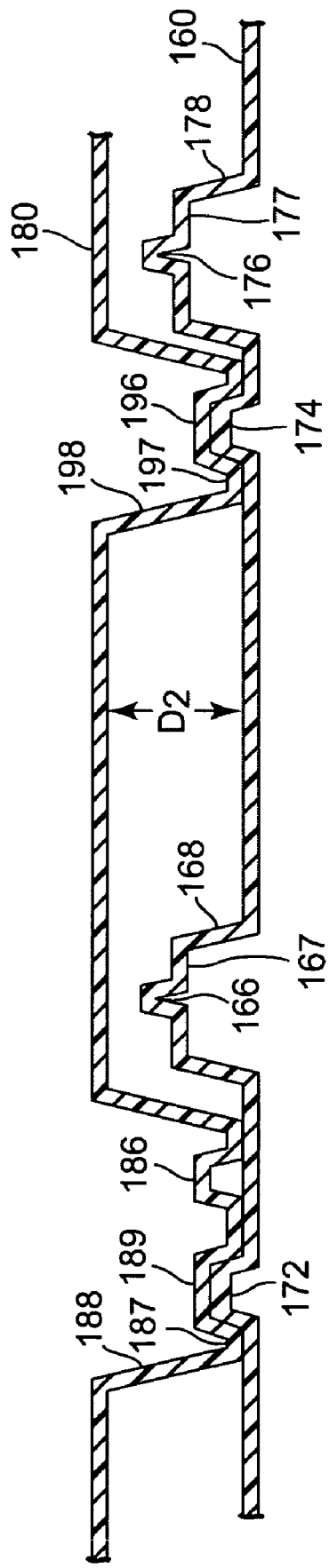
FIG. 19 is a cross-section view illustrating a second fastening position of the protective cover and the side-plate.

FIG. 18 is a cross-section view illustrating a first fastening position of the protective cover and the side-plate. FIG. 19 is a cross-section view illustrating a second fastening position of the protective cover and the side-plate. The first and second fixed locations refer to those with protective cover 180 and side-plate 160 before and after completing the securing of the bus bar.

Before beginning to securing the bus bar, protective cover 180 and side-plate 160 are positioned in the first fixed location. At this point, the opening (not shown) of protective cover 180 is positioned in the opening (not shown) located in the housing to store the bus bar (not shown) on side-plate 160.

At the first fixed location, protective cover 180 and side-plate 160 are removably fixed by the elastic interface fit of concave part 186 located on the top surface 187 of protruding part 188 of protective cover 180 with top surface 167 of protruding part 168 of side-plate 160. Concave part 196 located on top surface 197 of protruding part 198 of protective cover 180 joins convex part 176 located on top surface 177 of protruding part 178 of side-plate 160.

When top surfaces 187 and 197 of protruding parts 188 and 198 of protective cover 180 joins top surfaces 167 and 177 of protruding parts 168 and 178 of side-plate 160, gap $D_1$ is formed between protective cover 180 and side-plate 160. Gap $D_1$ is a total of the height of protruding parts 188 and 198 of protective cover 180 and the height of protruding parts 168 and 178 of side-plate 160. Gap $D_1$ is set to the appropriate value for the securing of the bus bar.

Similar to FIGS. 1-15, the bus bar held by side-plate 160 is fixed to the output terminal (not shown) placed on the side of the battery module by the fixing member (not shown) inserted through the flexible opening of protective cover 180.

After completing the securing of the bus bar, the interface fit of concave part 186 and convex part 166 is separated.

Protective cover 180 and side-plate 160 are positioned in the second fixed location by transferring protective cover 180 to side-plate 160 at another location. At this time, the curvature of the hinge member connecting side-plate 160 with protective cover 180 varies.

At the second fixed location, protective cover 180 and side-plate 160 are removably fixed by the elastic interface fit of concave parts 189 and 196 located on top surfaces 187 and 197 of protruding parts 188 and 198 of protective cover 180 with convex parts 172 and 174 of side-plate 160. Concave parts 166 and 176 of side-plate 160 do not join protective cover 180, so they do not interfere with the interface fit of concave parts 189 and 196 with convex parts 172 and 174.

Gap $D_2$ is formed when top surfaces 187 and 197 of protruding parts 188 and 198 of protective cover 180 join the base of side-plate 160. Gap $D_2$ corresponds to the height of protruding parts 188 and 198 of protective cover 180.

Because gap $D_1$ is a total of the height of protruding parts 188 and 198 of protective cover 180 and the height of protruding parts 168 and 178 of side-plate 160, gap $D_2$ is smaller than gap $D_1$.

As mentioned above, the case for the assembled battery can be downsized by reducing the space (dead space) occupied by side-plate 160 and protective cover 180. In addition, this smaller gap does not affect the securing of the bus bar because the gap between side-plate 160 and protective cover 180 is reduced after completing the securing of the bus bar.

The present invention is not limited to the abovementioned embodiments and can be appropriately modified within the scope of the claims. For example, when constructing the opening of the protective cover with a separate member having favorable rubber-like elasticity, the flexible part can be formed by a single cut.

Various implementations and embodiments of the invention have been described. Nevertheless, it is understood that various modifications can be made without departing form the invention. These and other embodiments are within the scope of the following claims.

The invention claimed is:

1. A battery assembly comprising:
a plurality of battery modules;
a side-plate that holds at least one bus bar that connects adjacent battery modules;
a fixing member that fixes the bus bar to an output terminal on a side of each of the plurality of battery modules; and
a protective cover that covers the side-plate, wherein the protective cover comprises a flexible opening formed by cutting the protective cover to form a plurality of flexible parts, wherein the fixing member is inserted through the flexible opening to open the plurality of flexible parts, and wherein an elasticity of the flexible parts allows bending for opening and closing to pass the fixing member.

2. The battery assembly of claim 1, wherein the flexible opening opens to accept the fixing member and closes once the fixing member passes through the flexible opening and fixes the bus bar to the terminals.

3. The battery assembly of claim 1, wherein the plurality of flexible parts are arranged radially toward the center of the flexible opening.

4. The battery assembly of claim 3, wherein the plurality of flexible parts of the flexible opening are in a plane of the protective cover when the flexible opening is closed.

5. The battery assembly of claim 1, wherein the side-plate and the protective cover are coupled with a bendable hinge member.

6. The battery assembly of claim 5, wherein the side-plate, the protective cover, and the bendable hinge member are formed by integral molding.

7. The battery assembly of claim 1, wherein the protective cover and the side-plate form a fixing structure for installing the protective cover over the side-plate.

8. The battery assembly of claim 7, wherein the fixing structure comprises a convex part coupled to a concave part and the convex part is formed in the protective cover and the concave part is formed in the side-plate 9. The battery assembly of claim 7, wherein the fixing structure comprises a convex part coupled to a concave part and the concave part is formed in the protective cover and the convex part is formed in the side-plate.

10. The battery assembly of claim 7, wherein the fixing structure comprises first and second fixing mechanisms comprising different gap distances between the protective cover and the side-plate, and wherein the gap distance of the second fixing mechanism is smaller than the gap distance of the first fixing mechanism.

11. The battery assembly of claim 10, wherein
the first fixing mechanism comprises a first convex part placed on one side of the side-plate and the protective cover and a first concave part placed on the other side of the side-plate and the protective cover, and wherein the first convex part and the first concave part are coupled by a first elastic interface fit; and
the second fixing mechanism comprises a second convex part placed on one side of the side-plate and the protective cover and a second concave part placed on the other side of the side-plate and the protective cover, and wherein the second convex part and the second concave part are coupled by a second interface fit.

12. The battery assembly of claim 11, wherein the first concave part of the first fixing mechanism is arranged on a top surface of a first protruding part that projects from a nearly flat base, and wherein the second concave part of the second fixing mechanism is arranged on a top surface of a second protruding part that projects from a nearly flat base.

13. The battery assembly of claim 1, wherein each of the plurality of battery modules comprises several serially connected secondary batteries.

14. A method comprising:
assembling a plurality of battery modules;
attaching at least one bus bar to a side-plate, wherein the bus bar connects adjacent battery modules;
fixing the bus bar to an output terminal on a side of each of the plurality of battery modules with a fixing member;
covering the side-plate with a protective cover;
cutting the protective cover to form a plurality of flexible parts of a flexible opening; and
inserting the fixing member through the flexible opening to open the plurality of flexible parts, wherein an elasticity of the flexible parts allows bending for opening and closing to pass the fixing member.

15. The method of claim 14, wherein cutting the protective cover allows the flexible opening opens to accept the fixing member and close once the fixing member passes through the flexible opening.

16. The method of claim 14, wherein cutting the protective cover to form a plurality of flexible parts comprises arranging the plurality of flexible parts radially toward the center of the flexible opening.

17. The method of claim 14, further comprising coupling the side-plate and the protective cover with a bendable hinge member.

18. The method of claim 14, further comprising installing the protective cover over the side-plate with a fixing structure formed of the side-plate and the protective cover.

19. The method of claim 18, further comprising forming a convex part in the protective cover and a concave part in the side-plate or forming the convex part in the side-plate and the concave part in the protective cover, wherein the convex part and concave part couple to form the fixing structure 20. The method of claim 18, further comprising changing the gap distance between the protective cover and the side-plate when the fixing member is fixed, wherein the gap distance of a second fixing mechanism is smaller than a gap distance of a first fixing mechanism.

21. The method of claim 20, further comprising:
   forming a first convex part on one side of the side-plate and the protective cover;
   forming a first concave part on the other side of the side-plate and the protective cover, wherein the first convex part and the first concave part are coupled by a first elastic interface fit to create the first fixing mechanism;
   forming a second convex part on one side of the side-plate and the protective cover; and
   forming a second concave part on the other side of the side-plate and the protective cover, wherein the second convex part and the second concave part are coupled by a second interface fit to create the second fixing mechanism.

22. The method of claim 21, wherein the first concave part of the first fixing mechanism is formed on a top surface of a first protruding part that projects from a nearly flat base, and wherein the second concave part of the second fixing mechanism is formed on a top surface of a second protruding part that projects from a nearly flat base.

23. The method of claim 14, further comprising attaching several serially connected secondary batteries to each of the plurality of battery modules.

24. A battery assembly comprising:
   a plurality of battery modules;
   means for holding at least one bus bar, wherein the bus bar connects adjacent ones of the plurality of battery modules;
   means for fixing the bus bar to output terminals on the side of the plurality of battery modules; and
   means for protecting holding means, wherein the protecting means comprises a means for accepting the fixing means by opening to receive the fixing means and closing as the fixing means is accepted, wherein the means for the fixing means is formed by cutting the protective means to form a plurality of flexible parts, wherein the fixing means is inserted through the opening to open the plurality of flexible parts, wherein an elasticity of the flexible parts allows bending for opening and closing to pass the fixing means.

25. The battery assembly of claim 24, wherein each of the plurality of battery modules comprises several serially connected secondary batteries in a side-by-side arrangement.

26. A battery assembly comprising:
   a plurality of battery modules;
   a side-plate that holds at least one bus bar that connects adjacent battery modules;
   a fixing member that fixes the bus bar to an output terminal on a side of each of the plurality of battery modules; and
   a cover having a flexible opening that opens to accept the fixing member and closes once the fixing member passes through the flexible opening, wherein the flexible opening is formed by cutting the cover to form a plurality of flexible parts, wherein the fixing member is inserted through the flexible opening to open the plurality of flexible parts, and wherein an elasticity of the flexible parts allows bending for opening and closing to pass the fixing member.

27. A protective cover of an assembled battery having a plurality of battery modules, a side-plate that holds at least one bus bar that connects adjacent battery modules, and a fixing member that fixes the bus bar to an output terminal on a side of each of the plurality of battery modules, the protective cover comprising:
   a flexible opening that opens to accept the fixing member and closes once the fixing member passes through the flexible opening and fixes the bus bar to the terminals, wherein the flexible opening is formed by cutting the protective cover to form a plurality of flexible parts of a flexible opening, wherein the fixing member is inserted through the flexible opening to open the plurality of flexible parts, and wherein an elasticity of the flexible parts allows bending for opening and closing to pass the fixing member.

28. The protective cover of claim 27, wherein the plurality of flexible parts are arranged radially toward the center of the flexible opening.

29. The protective cover of claim 28, wherein the plurality of flexible parts of the flexible opening are in a plane of the protective cover when the flexible opening is closed.

30. The protective cover of claim 27, wherein the protective cover and the side-plate form a fixing structure for installing the protective cover over the side-plate.

31. The protective cover of claim 30, wherein the fixing structure comprises a convex part coupled to a concave part and the convex part is formed in the protective cover and the concave part is formed in the side-plate 32. The protective cover of claim 30, wherein the fixing structure comprises a convex part coupled to a concave part and the concave part is formed in the protective cover and the convex part is formed in the side-plate.

33. The protective cover of claim 30, wherein the fixing structure comprises first and second fixing mechanisms comprising different gap distances between the protective cover and the side-plate, and wherein the gap distance of the second fixing mechanism is smaller than the gap distance of the first fixing mechanism.

34. The protective cover of claim 33, wherein
   the first fixing mechanism comprises a first convex part placed on one side of the side-plate and the protective cover and a first concave part placed on the other side of the side-plate and the protective cover, and wherein the first convex part and the first concave part are coupled by a first elastic interface fit; and
   the second fixing mechanism comprises a second convex part placed on one side of the side-plate and the protective cover and a second concave part placed on the other side of the side-plate and the protective cover, and wherein the second convex part and the second concave part are coupled by a second interface fit.

35. The protective cover of claim 34, wherein the first concave part of the first fixing mechanism is arranged on a top surface of a first protruding part that projects from a nearly flat base, and wherein the second concave part of the second fixing mechanism is arranged on a top surface of a second protruding part that projects from a nearly flat base.

* * * * *